May 5, 1964     L. W. BERGFIELD     3,131,685
GRILLE ROTATOR

Filed Jan. 22, 1962     2 Sheets-Sheet 1

LAWRENCE W. BERGFIELD,
INVENTOR.

BY Donald E. Windle.
ATTORNEY.

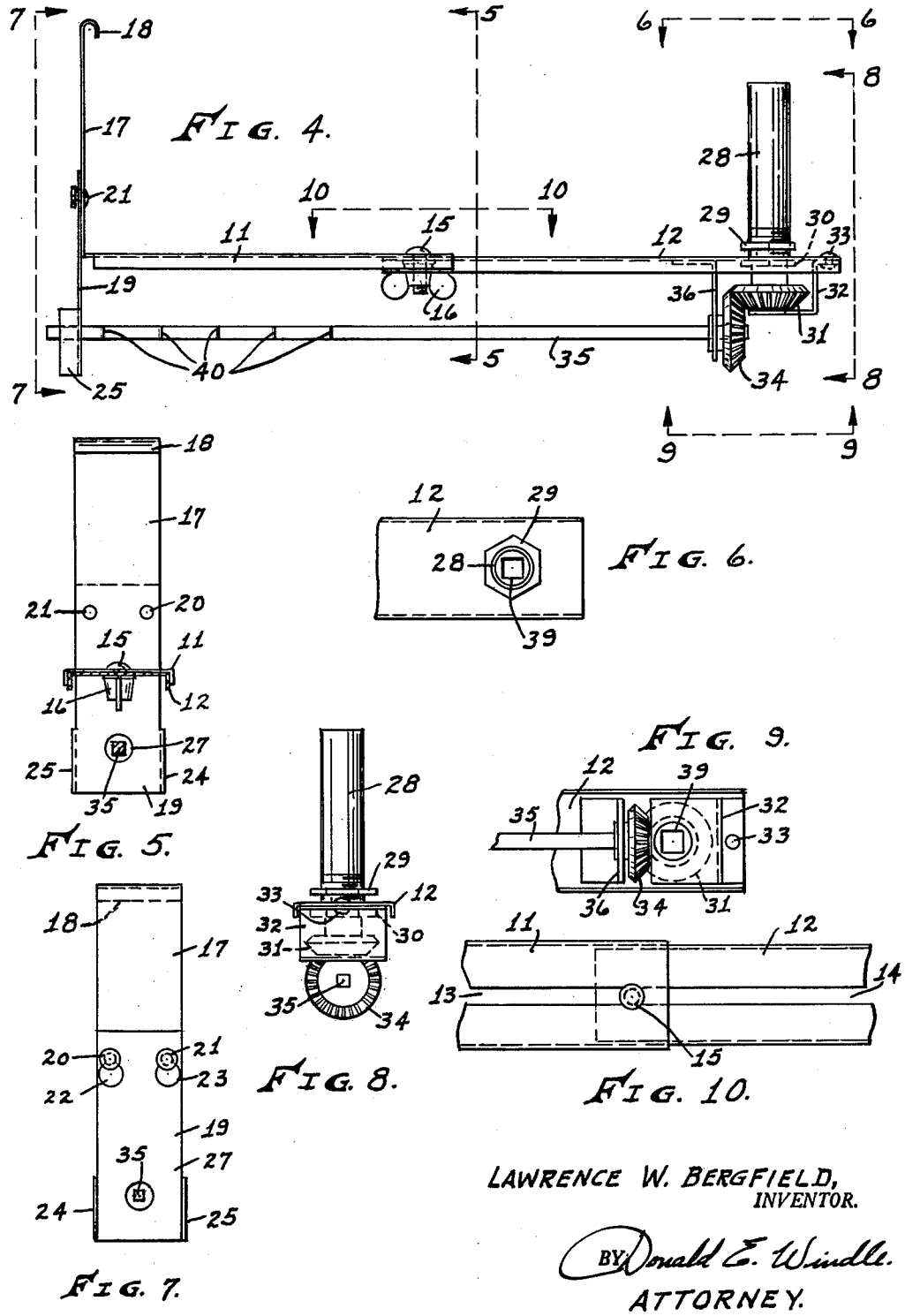

United States Patent Office 3,131,685
Patented May 5, 1964

3,131,685
GRILLE ROTATOR
Lawrence W. Bergfield, 547 S. E St., Richmond, Ind.
Filed Jan. 22, 1962, Ser. No. 167,777
1 Claim. (Cl. 126—25)

The present invention relates to means providing rotating movement to the conventional types of grilles ordinarily used in preparing meats for consumption as foods. The conventional types of grilles are composed of a pan-like member supported by leg members, with the pan member being adapted to contain fuel such as charcoal. The meat-receiving grille is formed of wire mesh construction and is positioned in rotatable relation with the pan by means of a center post extending downwardly through the center of the pan. There is also a height-adjusting lever provided for raising and lowering the grille with relation to the pan member with the inner end of the lever being adapted to bear against the lower end of the center post. The height-adjusting lever is further provided with a ratchet or similar device for maintaining the desired height adjustment of the grille through the center post.

The principal object of the invention is the provision of means providing for more even distribution of heat to the meat carried by the grille.

A second object is the provision of means for continuously motivating the grille and rotating the same at a constant speed.

Another object is the provision of a grille operational means which permits raising and lowering of the grille in the usual manner.

A further object is the provision of means for adapting the device for different sizes or diameters of pan members.

A still further object is the provision of a grille rotating means readily adaptable to both existing and new types of grilles.

Other particular objects and advantages of the invention will suggest themselves in the course of the following description, and that which is new will be pointed out in the appended claim.

In order that the invention and the operation thereof may be more fully understood and appreciated, I will now take up a detailed description thereof in which the same will be more fully set forth, reference being made to the accompanying drawings forming a part hereof, in which:

FIGURE 4 is a detail side elevation of the invention, per se.

FIGURE 5 is a detail section through the device, as taken on line 5—5 of FIGURE 4.

FIGURE 6 is a partial plan view, taken from line 6—6 of FIGURE 4.

FIGURE 7 is an elevational view taken from line 7—7 of FIGURE 4.

FIGURE 8 is an elevational view, taken from line 8—8 of FIGURE 4.

FIGURE 9 is a partial underside view, taken from line 9—9 of FIGURE 4.

FIGURE 10 is a partial plan view showing the sliding joint of the frame member of the device, with the same being taken from line 10—10 of FIGURE 4.

Like characters of reference designate like parts throughout the several views of the drawings.

In order that the construction of the invention may be more fully understood and appreciated, I will now take up a further detailed description thereof in which the same, together with the operation thereof, will be more fully and comprehensively set forth.

Figure 1:
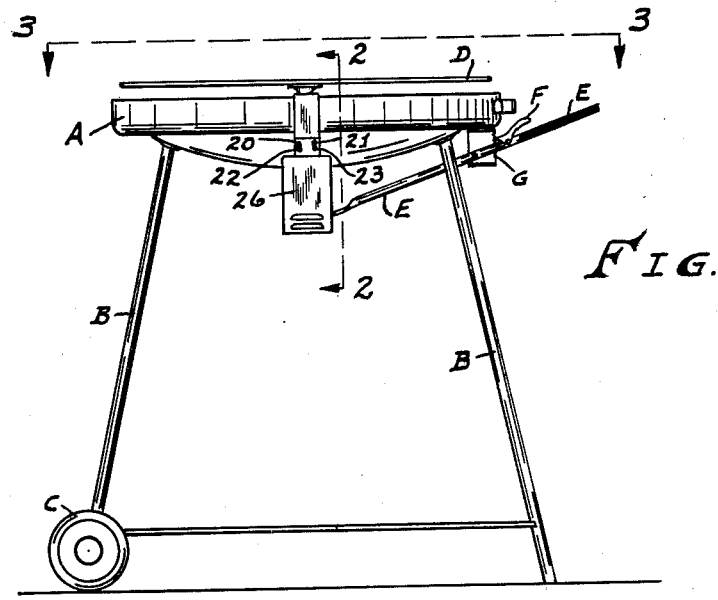
FIGURE 1 is a side elevation of a grille, with the same embodying the features of the invention.
Figure 2:
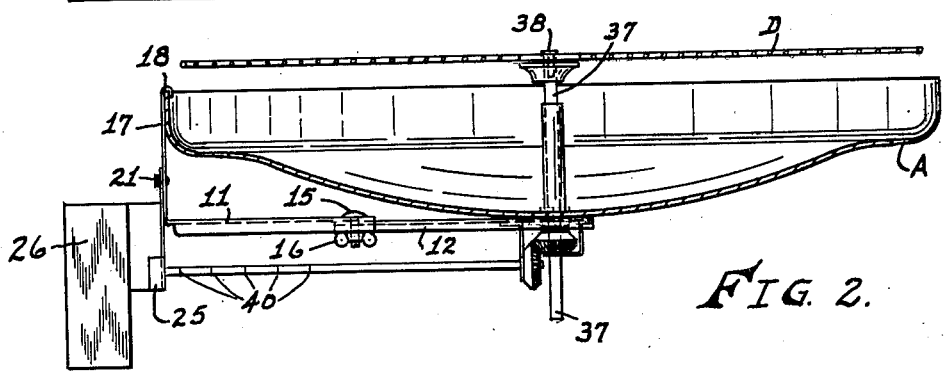
FIGURE 2 is a sectional detail through the grille, taken on line 2—2 of FIGURE 1.

Referring now to the drawings in detail, letters A designate the pan member which is of the conventional type and which is adapted to be partially filled with charcoal or other suitable fuel. The pan A is shown as being supported by a conventional undercarriage consisting of legs B and wheels C. The grille, which is also of the conventional type is indicated by letters D. The grille is of flat mesh construction formed circular in shape to conform generally to the circular side of the pan A. The grille D has a downwardly-extending supporting post which is secured to and extends downwardly through the bottom of the pan A to a point where the lower end thereof is engageable by the inner end of a raising and lowering lever E, the position of which is set in the desired position through the medium of a catch F engageable with the ratchet G, as more clearly shown in FIGURE 1.

All of the above lettered members are portions of conventional types of grilles and are no part of the invention per se.

Figure 3:
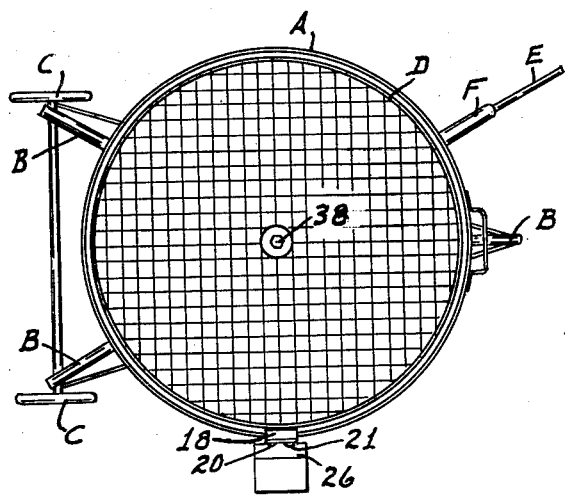
FIGURE 3 is a top plan view of the grille, taken from line 3—3 of FIGURE 1.

Numerals 11 and 12 designate a pair of companion telescoping members, with each of the members being provided with a longitudinal slot, the slot in member 11 being indicated as 13, and the slot in member 12 being designated as 14. The two members 11 and 12 are of channel shape with the member 12 being adapted for longitudinal movement in the member 11 and with the same being adapted to be maintained in their respective desired adjusted positions by means of bolt 15 and wing nut 16. The outer end portion 17 of member 11 is turned upwardly with a hook portion 18 formed on the upper end thereof, with the hook portion 18 being adapted to engage the upper rim edge of pan A, as more clearly shown in FIGURES 1 and 3. A motor-hanger member 19 is removably secured onto the member 17. I have provided a pair of spaced-apart rivets 20 and 21 in the member 17 and have provided companion slotted apertures 22 and 23 in the motor-hanger member 19 and with the apertures 22 and 23 being adapted to be fitted over the respective rivets 20 and 21, and with a downward movement of the motor-hanger member 19 engaging the slots formed at the upper portions of apertures 22 and 23 with the respective rivets 20 and 21. Ears 24 and 25 are formed at the lower end of the motor-hanger member 19 through which the motor and gear box housing 26 may be secured thereto. A circular aperture 27 is formed through the lower end of the motor-hanger member 19, the purpose of which will be hereinafter set forth.

The inner end portion of member 12 has an aperture formed therethrough for the reception of vertically-positioned sleeve 28, with the sleeve being rigidly secured therein by means of a top jam nut 29 and a lower jam nut 30. A bevel gear 31 is rotatably secured under the lower end of sleeve 28 and is secured against downward movement with relation to the lower end of sleeve 28 by means of bracket 32 which is rigidly secured to the end of member 12 by means of rivet 33. A second bevel gear 34 is meshed with gear 31 and has the inner end of square shaft 35 engaged therewith, and with the shaft extending outwardly therefrom and through aperture 27 of the member 19, with the outer end thereof being adapted to engage a drive aperture of the motivating gears inside the motor and gear box 26. The inner end of shaft 35 and gear 34 are supported by means of a hanger bracket 36 which is secured to the under side of member 12.

The conventional type grille is provided with a round post through which the grille may be raised and lowered by means of lever E. In carrying out the invention, the conventional round post is replaced by square post 37 which is secured to the grille by means of screw 38 threaded into the upper end of the post. The lower end portion of post 37 extends vertically through bevel gear 31, with the lower end of the post being engageable by the inner end of lever E in the conventional manner. Bevel gear 31 has a square aperture 39 formed vertically therethrough for the reception of the lower end portion of the post 37.

Grilles, as manufactured, are made of various diameters, with the variations of the diameters being approximately one inch. In order to provide the necessary adjustment of the invention to different diameter grilles, I provide the square shaft 35 with a series of scores 40, at which points the shaft may easily be broken to suit the diameter of the grille with which the device is to be used. When the invention is applied to the grilles at the point of manufacture, the shaft 35 can be furnished of the proper length without the scores 40.

Some grilles, when manufactured, are provided with spits located above the mesh grilles and which spits are rotated by means of an electric motor and gears connected with the shaft thereof. It is the intent of this invention, in such cases, to use the same motor and gears, by relocation, to rotate the grille by means of the invention as shown.

In preparing meats over the conventional grille, it is difficult to manually rotate the grille at a constant speed in order to provide a uniform amount of heat to each piece of the meat carried by the grille. By the application of the invention, the grille is constantly rotated at a uniform speed without any attention being necessary thereto, resulting in each piece of the meat on the grille being given the same amount of heat and with each piece of meat being uniformly heated to the desired degree.

While the invention has been shown and described in its presently-preferred form, I desire that it be understood minor changes may be made therein, insofar as the changes may fall within the scope of the appended claim and the spirit of the invention.

Having now shown and described the invention, what I claim and desire to secure by Letters Patent of the United States, is:

In combination with a grille comprising a fuel-receiving pan having a rotatable mesh grille member, a center post secured to and depending from the center of the grille and extending downwardly through the fuel-receiving pan, a power supply and grille rotator, said grille rotator comprising a linkage located below the fuel-receiving pan and having one end thereof secured to the power supply and removably secured to the rim of the fuel-receiving pan, with the other end thereof engaging the center post of the mesh grille member, and with the linkage providing means coupling the power transmitted by the power supply to the center post of the mesh grille member.

References Cited in the file of this patent
UNITED STATES PATENTS

| | | |
|---|---|---|
| 653,619 | Devin | July 10, 1900 |
| 1,552,854 | James | Sept. 8, 1925 |
| 1,785,079 | Grapp | Dec. 16, 1930 |
| 2,819,667 | Victor | Jan. 14, 1958 |
| 3,033,189 | Clark | May 8, 1962 |
| 3,033,190 | Atkinson | May 8, 1962 |
| 3,085,497 | Statia | Apr. 16, 1963 |
| 3,090,372 | Evans | May 21, 1963 |